United States Patent
Lee et al.

(10) Patent No.: US 12,297,337 B2
(45) Date of Patent: May 13, 2025

(54) AQUEOUS DISPERSION COMPOSITION COMPRISING ETHYLENE-CARBOXYLIC ACID

(71) Applicants: SK Innovation Co., Ltd., Seoul (KR); SK Geo Centric Co., Ltd., Seoul (KR)

(72) Inventors: Jae Eun Lee, Daejeon (KR); Ji Sun Choi, Daejeon (KR); Doh Yeon Park, Daejeon (KR); Hai Jin Shin, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 17/767,535

(22) PCT Filed: Sep. 29, 2020

(86) PCT No.: PCT/KR2020/013291
§ 371 (c)(1),
(2) Date: Apr. 8, 2022

(87) PCT Pub. No.: WO2021/071165
PCT Pub. Date: Apr. 15, 2021

(65) Prior Publication Data
US 2024/0067808 A1    Feb. 29, 2024

(30) Foreign Application Priority Data

Oct. 11, 2019   (KR) .................. 10-2019-0125911

(51) Int. Cl.
| | | |
|---|---|---|
| *C08L 23/08* | (2006.01) | |
| *C08J 3/03* | (2006.01) | |
| *C08L 23/0876* | (2025.01) | |
| *C08L 91/06* | (2006.01) | |

(52) U.S. Cl.
CPC ............ *C08L 23/0876* (2013.01); *C08J 3/03* (2013.01); *C08L 91/06* (2013.01); *C08F 2500/12* (2013.01); *C08J 2323/08* (2013.01); *C08J 2491/06* (2013.01); *C08L 2201/54* (2013.01)

(58) Field of Classification Search
CPC ............ C08L 23/0876; C08L 2201/54; C08L 91/06; C08J 3/03; C08J 2491/06; C08F 6/02; C08F 210/02
See application file for complete search history.

(56) References Cited

U.S. PATENT DOCUMENTS

| | | | | |
|---|---|---|---|---|
| 3,756,973 A | * | 9/1973 | Stahl | ................ C08J 3/05 524/512 |
| 4,459,129 A | | 7/1984 | Gooding et al. | |
| 4,695,503 A | * | 9/1987 | Liu | ............... B32B 7/12 442/326 |
| 5,827,612 A | | 10/1998 | Girgis | |
| 6,447,899 B1 | * | 9/2002 | Dutton | ................ B32B 27/30 428/522 |
| 8,987,350 B2 | | 3/2015 | Li et al. | |
| 2006/0003901 A1 | | 1/2006 | Sohi | |
| 2007/0160833 A1 | | 7/2007 | Maak et al. | |
| 2015/0203704 A1 | * | 7/2015 | Hayes | ............ C09D 123/0876 524/556 |
| 2016/0145806 A1 | * | 5/2016 | Rhee | ................ D21H 19/12 524/265 |

FOREIGN PATENT DOCUMENTS

| | | |
|---|---|---|
| CA | 1103109 A | 6/1981 |
| CN | 107075131 A | 8/2017 |
| EP | 2172529 A1 | 4/2010 |
| JP | H01104671 A | 4/1989 |
| JP | H04153239 A | 5/1992 |
| JP | H05156208 A | 6/1993 |
| JP | H06184987 A | 7/1994 |
| JP | H08334484 A | 12/1996 |
| JP | H09058141 A | 3/1997 |
| JP | H9268480 A | 10/1997 |
| JP | 2000007860 A | 1/2000 |
| JP | 2000248140 A | 9/2000 |
| JP | 2005247338 A | 9/2005 |
| JP | 2005316164 A | 11/2005 |
| JP | 200645313 A | 2/2006 |
| JP | 2008045070 A | 2/2008 |
| JP | 201043186 A | 2/2010 |
| JP | 4699683 B2 | 6/2011 |
| JP | 201425163 A | 2/2014 |
| KR | 100983435 B1 | 9/2010 |
| KR | 1020120020378 A | 3/2012 |
| KR | 1020140115234 A | 9/2014 |

(Continued)

OTHER PUBLICATIONS

Standring et al. 2016, 'Investigation into paraffin wax and ethylene vinyl acetate blends for use as a carrier vehicle in ceramic injection moulding', Polymer—Plastics Technology and Engineering. (Year: 2016).*

Webber, Wax Characterization by Instrumental Analysis; Dec. 2000 (Year: 2000).*

"Advantra PHC-9256", H.B. Fuller, 2021, retrieved from https://www.hbfuller.com/en/north-america/products-and-technologies/brands/advantra?gad=1&gclid=EAlaIQobChMIie_hg52OgAMVW5qDBx1uVw3nEAAYAiAAEgKOrPD_BwE.

"Michem Emulsion 34935", Michelman, 2023, retrieved from https://www.michelman.com/solutions/michem-emulsion/michem-r-emulsion-34935/.

*Primary Examiner* — Marc S Zimmer
*Assistant Examiner* — Surbhi M Du
(74) *Attorney, Agent, or Firm* — The Webb Law Firm

(57) ABSTRACT

An aqueous dispersion composition according embodiments of the present invention includes an ethylene-carboxylic acid copolymer, an anti-blocking agent including a polymer wax included in a content of 5 wt % or more based on a weight of the ethylene-carboxylic acid copolymer, and an aqueous dispersion medium. A peak area corresponding to a melting point of 80° C. or less in a differential scanning calorimetry (DSC) graph is 50% or more. Blocking phenomenon is suppressed using the anti-blocking agent while achieving desired heat seal properties.

9 Claims, No Drawings

(56) References Cited

FOREIGN PATENT DOCUMENTS

| | | |
|---|---|---|
| KR | 1020170075546 A | 7/2017 |
| WO | 2005085331 A1 | 9/2005 |
| WO | 2017050589 A1 | 3/2017 |

\* cited by examiner

AQUEOUS DISPERSION COMPOSITION COMPRISING ETHYLENE-CARBOXYLIC ACID

CROSS-REFERENCE TO RELATED APPLICATIONS

This application is the United States national phase of International Application No. PCT/KR2020/013291 filed Sep. 29, 2020, and claims priority to Korean Patent Application No. 10-2019-0125911 filed Oct. 11, 2019, the disclosures of which are hereby incorporated by reference in their entirety.

BACKGROUND OF THE INVENTION

Field of the Invention

The present invention relates to an aqueous dispersion composition including an ethylene-carboxylic acid copolymer. More particularly, the present invention relates to an aqueous dispersion composition including an ethylene-carboxylic acid copolymer and an additive.

Description of Related Art

For example, an ethylene-carboxylic acid copolymer such as an ethylene-acrylic acid copolymer is used for various products such as a sealing material, an adhesive, a packing material, an optical film, etc. The ethylene-acrylic acid copolymer may be prepared in the form of an aqueous dispersion to be used for a formation of a coating layer or an adhesive layer.

For example, the aqueous dispersion may be applied to a surface of a polymer film, a paper, a metal foil, a fabric, etc., and then heated to form an adhesive layer or a fusion layer.

The ethylene-carboxylic acid copolymer contains an acid group in a copolymer structure, and thus has a self-adhesive property. Accordingly, a blocking phenomenon which may cause an adhesion to other media such as a container may occur during storage of the dispersion. When an additive such as an anti-blocking agent is included in the dispersion to resolve the blocking phenomenon, an adhesive strength of the dispersion and mechanical properties of an adhesive layer formed therefrom may be degraded.

In consideration of the above aspects, construction of a composition capable of maintaining adhesion reliability is required.

For example, International Patent Publication Nos. WO2005/085331 and WO2017/050589 disclose a formation of a heat-sealable coating using aqueous polymer dispersions.

SUMMARY OF THE INVENTION

Technical Objective

According to an aspect of the present invention, there is provided an aqueous dispersion composition including an ethylene-carboxylic acid copolymer having improved adhesive reliability.

Technical Means

According to exemplary embodiments, an aqueous dispersion composition includes an ethylene-carboxylic acid copolymer, an anti-blocking agent comprising a polymer wax included in a content of 5 wt % or more based on a weight of the ethylene-carboxylic acid copolymer, and an aqueous dispersion medium. A peak area corresponding to a melting point of 80° C. or less in a differential scanning calorimetry (DSC) graph is 50% or more; and In some embodiments, a weight average molecular weight (Mw) of the polymer wax may be from 500 to 1,500.

In some embodiments, a polydispersity index (PDI) of the polymer wax may be from 1 to 4.

In some embodiments, the ethylene-carboxylic acid copolymer may include an ethylene-acrylic acid (EAA) copolymer.

In some embodiments, an ethylene ratio in the EAA copolymer is from 75 wt % to 85 wt %, and an acrylic acid ratio in the EAA copolymer is from 15 wt % to 25 wt %.

In some embodiments, wherein a melt flow index (MFI) measured at 190° C. and 2.16 kg of the ethylene-carboxylic acid copolymer is from 250 g/10 min to 1,500 g/10 min.

In some embodiments, the composition may further include a neutralizing agent, and a degree of neutralization of the ethylene-carboxylic acid copolymer may from 40% to 100%.

In some embodiments, the neutralizing agent may include ammonia or an alkali metal salt.

In some embodiments, a content of the anti-blocking agent may be from 5 wt % to 10 wt % based on the weight of the ethylene-carboxylic acid copolymer.

In some embodiments, a solid content of the aqueous dispersion composition may be from 20% to 50%.

Effects of the Invention

In exemplary embodiments, an aqueous dispersion composition may include a natural wax-based anti-blocking agent having a predetermined melting point range together with an ethylene-carboxylic acid copolymer. Accordingly, a desired adhesive strength may be maintained while remarkably reducing a blocking phenomenon during a storage.

The aqueous dispersion composition may further include a neutralizing agent, and physical properties and contents of the ethylene-carboxylic acid copolymer and the neutralizing agent may also be adjusted to maintain a balance between the adhesive strength and anti-blocking properties.

EMBODIMENTS FOR PRACTICING THE INVENTION

The aqueous dispersion composition according to embodiments of the present invention may include an ethylene-carboxylic acid copolymer, an anti-blocking agent and an aqueous dispersion medium (e.g., water), and may further include a neutralizing agent.

The ethylene-carboxylic acid copolymer may be produced through a copolymerization reaction of ethylene and a carboxylic acid monomer. In exemplary embodiments, acrylic acid may be used as the carboxylic acid monomer. In this case, the ethylene-carboxylic acid copolymer may include an ethylene-acrylic acid (EAA) copolymer.

The term "acrylic acid" used in the present application may be used to also encompass methacrylic acid, and may also be used to encompass an ester product thereof (e.g., acrylate, methacrylate).

Hereinafter, an exemplary case of using the EAA copolymer as the ethylene-carboxylic acid copolymer will be described.

Properties of the EAA copolymer may be adjusted to obtain a viscous fluid that may be substantially coated for implementing coating properties of the aqueous dispersion composition.

In some embodiments, a content of acrylic acid (e.g., an acrylic acid-derived unit or an acrylic acid-derived block) based on a total weight of the EAA copolymer may be from 15 weight percent (wt %) to 25 wt %. In this case, a content of ethylene (e.g., an ethylene-derived unit or an ethylene-derived block) may be from 75 wt % to 85 wt %.

When the content of acrylic acid is relatively small, adhesion on a hydrophobic substrate (e.g., a resin substrate such as polyolefin) may be improved. When the content of acrylic acid is high, efficient copolymer production may not be easily implemented due to problems such as a generation of polyacrylic acid during the production. Therefore, the content of acrylic acid may be adjusted in the above-mentioned range, so that adhesion of a coating layer or a sealing layer including the ethylene-acrylic acid copolymer may be improved.

In some embodiments, a melt flow index (MFI) of the EAA copolymer may be in a range from 250 g/10 min to 1,500 g/10 min under conditions of 190° C. and 2.16 kg. Within the above range, excessive degradation of heat resistance and mechanical strength of the adhesive layer or the sealing layer formed from the aqueous dispersion composition may be prevented while improving the coating properties by increasing a flowability of the aqueous dispersion composition.

In some embodiments, a degree of neutralization of the EAA copolymer may be from 40% to 100%, preferably from 40% to 80%, more preferably from 45% to 80%.

The term "a degree of neutralization" used in the present application may refer to a ratio reacted or neutralized by a neutralizing agent among acid groups (carboxylic acid groups) included in the EAA copolymer. Excessive viscosity increase of the aqueous dispersion composition may be suppressed within the above-mentioned range of the degree of neutralization, and sufficient dispersibility and coating uniformity may be achieved.

A neutralizing agent may be included to at least partially neutralize the acid groups of the EAA copolymer as described above. For example, the neutralizing agent may be mixed with the EAA copolymer to provide a substantially aqueous dispersion composition as a coatable viscous fluid.

As the neutralizing agent, a basic compound may be used without any particular limitation. In a preferable embodiment, the neutralizing agent may include an organic base such as ammonia or an amine-based compound. The neutralizing agent may include an alkali metal salt such as LiOH, KOH, NaOH, CsOH, or the like. These may be used alone or in combination of two or more therefrom.

If an amount of the neutralizing agent is excessively reduced, the dispersion may not be substantially prepared, and a blocking phenomenon may be caused by acid groups of the EAA copolymer.

If the amount of the neutralizing agent is excessively increased, a viscosity of the aqueous dispersion composition may be increased to deteriorate the coating properties, and adhesive properties may be also degraded.

In an embodiment, when ammonia is used as the neutralizing agent, the amount of the neutralizing agent may be 10 wt % or less (e.g., from 1 wt % to 10 wt %, 5 wt % to 10 wt %) of the total weight of the composition. When the above-described alkali metal salt is used as the neutralizing agent, the content of the neutralizing agent may be from 1 wt % or less (e.g., 0.1 wt % to 1 wt %, 0.5 wt % to 1 wt %) based on the total weight of the composition.

In exemplary embodiments, the aqueous dispersion composition may include a wax or paraffin-based anti-blocking agent.

For example, the acid groups of the EAA copolymer may be partially neutralized using the above-described neutralizing agent to form the aqueous dispersion. However, in the case of using the neutralizing agent such as ammonia (or aqueous ammonia ($NH_4OH$)), the neutralizing agent may be easily volatilized or evaporated, and acid groups may be excessively exposed or remained. Accordingly, the blocking phenomenon that the aqueous dispersion composition sticks to a container or other medium may occur during a storage of the aqueous dispersion composition.

However, the aqueous dispersion composition according to exemplary embodiments may further include the anti-blocking agent to reduce or inhibit the above-described blocking phenomenon while maintaining the adhesive strength of the composition.

In some embodiments, the anti-blocking agent may include a natural wax or paraffin-based material. For example, microcrystalline wax, natural wax, synthetic wax, Fischer-Tropsch wax, polyethylene wax, etc., may be used.

In a preferable embodiment, a polymer wax having a melting point (Tm) of 80° C. or less may be used as the anti-blocking agent. For example, a polymer wax from which a plurality of Tm peaks are generated in a graph obtained through a differential scanning calorimetry (DSC) and a peak area of 80° C. or less among the Tm peaks is 50% or more of a total peak area may be used.

Anti-blocking properties may be substantially implemented by using the polymer wax having the above-described melting point range.

In some embodiments, a weight average molecular weight (Mw) of the anti-blocking agent may be in a range from 500 to 1,500. The anti-blocking properties may be sufficiently implemented without increasing the viscosity of the aqueous dispersion composition within the above range.

In an embodiment, a polydispersity index (PDI) of the anti-blocking agent may be from 1 to 4. Within the above range, excessive increase of viscosity of the aqueous dispersion composition may be prevented while preventing generation of non-dispersible components due to reduction of a uniformity in a molecular weight distribution.

In some embodiments, a content of the anti-blocking agent may be 5 wt % or more based on the total weight of the EAA copolymer. If the content of the anti-blocking agent is less than 5 wt %, the anti-blocking property may not be substantially implemented. In a preferable embodiment, the content of the anti-blocking agent may be in a range from 5 wt % to 10 wt % based on the total weight of the EAA copolymer.

A solid content of the above-described aqueous dispersion composition may be in a range from 20 wt % to 50 wt %, preferably from 25 wt % to 30 wt %. Within the above range, volatile components may be easily removed at a low temperature to form the adhesive layer or the sealing layer.

The aqueous dispersion composition may be used as a sealing material for a packaging film including polyethylene, polypropylene, polymethyl methacrylate, polyethylene terephthalate, etc. For example, the aqueous dispersion composition may be coated on a surface of a sealing portion of the packaging film, and then the sealing layer or the adhesive layer may be easily formed through a thermal compression.

Further, the aqueous dispersion composition may be coated on various objects such as paper, a resin film, a metal foil, etc., to form an insulating structure such as an adhesive layer, an antistatic layer, an encapsulation layer, or the like.

The aqueous dispersion composition may further include other additives within a range without degrading properties such as dispersibility and thermal properties from the EAA copolymer. For example, the additives may include an antistatic agent, a surfactant, an inorganic particle, or the like.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Examples and Comparative Examples

An aqueous dispersion composition including an EAA copolymer having a degree of neutralization of 80% and having a total solid content of 25% was prepared. The aqueous dispersion compositions of Examples and Comparative Examples were prepared by adding wax-based anti-blocking agents of types and contents shown in Table 1 below in the aqueous dispersion composition.

In Comparative Examples 5 and 6, the anti-blocking agent was omitted and a neutralizing agent was only added.

Experimental Example (1) Measuring Molecular Weight of Anti-Blocking Agent 5 mg of each anti-blocking agent was taken and dissolved using 1M of 1,2,4-trichlorobenzene containing 200 ppm of butylated hydroxytoluene (BHT) used as a system eluent. The sample was prepared by stirring at 150° C. for 4 hours using a pre-treatment device (Agilent PL-SP 260 VS Sample Preparation System).

A weight average molecular weight (Mw) and a number average molecular weight (Mn) of the sample were measured using a GPC system (PL-GPC220 (Agilent)) connected with a refractive index detector and a polystyrene standard.

PDI (Mw/Mn) was calculated using the measured Mw and Mn.

(2) Measuring Melting Point of Anti-Blocking Agent

A melting point was measured using a differential scanning calorimeter (measuring instrument: TA company Q20).

Specifically, 10 mg of the anti-blocking agent sample was placed in an aluminum crucible and covered with a lid including a pinhole.

While supplying nitrogen as a purge gas at a flow rate of 50 mL/min, a temperature was raised in a range from −50° C. to 180° C. (a first temperature increase section) at rate of 10° C./min and then maintained isothermal at 180° C. for 1 minute. Thereafter, the sample was crystallized by being cooled from 180° C. to −50° C. at a rate of 10° C./min. The temperature was changed from −50° C. to 180° C. at a rate of 10° C./min in a second temperature increase section, and temperatures (Tm) of melting peaks occurring in the second temperature increase section were measured, and a ratio of a peak area of 80° C. or less was calculated.

(3) Blocking Force of Aqueous Dispersion Composition

Based on a Blocking Resistance Method B test method of ISO 11502, an evaluation as follows was performed (measuring instrument: Instron). A sample size of a substrate coated with the aqueous dispersion composition was 760× 100 mm. A substrate coated with the aqueous dispersion composition and an uncoated substrate were in contact with each other, a load of 2.3 kg was applied. The sample was left at 50° C. for 3 hours, and then left in a room of constant temperature and humidity for 24 hours. Aluminum blocks of 100×100 mm was placed at upper and lower portions of a tensile testing machine, and then the sample was placed between the aluminum blocks and fixed. A maximum force was measured after pulling at a speed of 500 mm/min.

(4) Measuring Heat Seal of Aqueous Dispersion Composition

Based on a standard of ASTM F88, an evaluation as follows was performed (measurement device: Instron). A sample having a size of 250×10 mm was manufactured using a device (Gradient Heat Seal Tester) conforming to ASTM F2029. A substrate coated with the aqueous dispersion composition and an uncoated substrate were in contact with each other and placed in a Gradient Test device, and then adhered by applying a pressure of 2 bar for 1 sec at a constant temperature. After being left in a room of constant temperature and humidity for 24 hours, upper and lower portions of the sample were fixed in a tensile testing machine, and then tensioned at a speed of 300 mm/min to measure an average of a constant force interval.

The results are shown in Table 1 below.

TABLE 1

| No | Type of Wax (wt % based on EAA copolymer) | Mw | PDI | Tm peak Area of 80° C. or less (%) | Tm Peak (° C.) | Blocking Force (kgf) | Heat Seal (kgf/ 25 mm) (100° C.) |
|---|---|---|---|---|---|---|---|
| Example 1 | microcrystalline (5 wt %) | 771 | 1.365 | 77.40 | 34.02/ 51.60/ 85.96/ 97.29/ 103.30 | | |
| Example 2 | Parrafin wax emulsion) (5 wt %) | 1285 | 3.714 | 65.12 | 41.30/ 58.29/ 90.32/ 97.81 | | |

TABLE 1-continued

| No | Type of Wax (wt % based on EAA copolymer) | Mw | PDI | Tm peak Area of 80° C. or less (%) | Tm Peak (° C.) | Blocking Force (kgf) | Heat Seal (kgf/ 25 mm) (100° C.) |
|---|---|---|---|---|---|---|---|
| Comparative Example 1 | High Density Polyethylene (5 wt %) | 14770 | 2.007 | 4.68 | 128.29 | | |
| Comparative Example 2 | Fischer-Tropsch (5 wt %) | 879 | 1.570 | 22.93 | 88.81/ 108.42 | | |
| Comparative Example 3 | modified PE (5 wt %) | 1548 | 2.745 | 36.86 | 41.69/ 56.67/ 101.37/ 119.84 | | |
| Comparative Example 4 | microcrystalline (3 wt %) | 771 | 1.365 | 77.40 | 34.02/ 51.60/ 85.96/ 97.29/ 103.30 | 0.9 | 1.1 |
| Comparative Example 5 | No Wax (ammonia neutralization) | — | — | — | — | 0.9 | 1.2 |
| Comparative Example 6 | No Wax (KOH neutralization) | — | — | — | — | 0.1 | 0.1 |

Referring to Table 1, in the aqueous dispersion compositions containing the anti-blocking agent of Examples, the blocking force was reduced while stable heat seal property was provided.

In Comparative Examples 1 to 3 where the Tm peak area of the wax was reduced to less than 50%, and in Comparative Examples 5-6 where the wax was not added, the blocking force was increased or the heat seal was significantly decreased.

In Comparative Example 4 where the wax content was 3 wt %, the anti-blocking property was not substantially implemented.

What is claimed is:

1. An aqueous dispersion composition, comprising:
   an ethylene-carboxylic acid copolymer;
   an anti-blocking agent comprising a polymer wax included in a content of 5 wt % to 10 wt % based on a weight of the ethylene-carboxylic acid copolymer, wherein a peak area corresponding to a melting point of 80° C. or less in a differential scanning calorimetry (DSC) graph is 50% or more; and
   an aqueous dispersion medium,
   wherein the polymer wax is at least one of a microcrystalline wax, a synthetic wax, a Fischer-Tropsch wax or a polyethylene wax.

2. The aqueous dispersion composition of claim 1, wherein a weight average molecular weight (Mw) of the polymer wax is from 500 to 1,500.

3. The aqueous dispersion composition of claim 1, wherein a polydispersity index (PDI) of the polymer wax is from 1 to 4.

4. The aqueous dispersion composition of claim 1, wherein the ethylene-carboxylic acid copolymer comprises an ethylene-acrylic acid (EAA) copolymer.

5. The aqueous dispersion composition of claim 4, wherein an ethylene ratio in the EAA copolymer is from 75 wt % to 85 wt %, and an acrylic acid ratio in the EAA copolymer is from 15 wt % to 25 wt %.

6. The aqueous dispersion composition of claim 1, wherein a melt flow index (MFI) measured at 190° C. and 2.16 kg of the ethylene-carboxylic acid copolymer is from 250 g/10 min to 1,500 g/10 min.

7. The aqueous dispersion composition of claim 1, further comprising a neutralizing agent,
   wherein a degree of neutralization of the ethylene-carboxylic acid copolymer is from 40% to 100%.

8. The aqueous dispersion composition of claim 7, wherein the neutralizing agent comprises ammonia or an alkali metal salt.

9. The aqueous dispersion composition of claim 1, wherein a solid content of the aqueous dispersion composition is from 20% to 50%.

* * * * *

UNITED STATES PATENT AND TRADEMARK OFFICE
CERTIFICATE OF CORRECTION

| | | |
|---|---|---|
| PATENT NO. | : 12,297,337 B2 | Page 1 of 1 |
| APPLICATION NO. | : 17/767535 | |
| DATED | : May 13, 2025 | |
| INVENTOR(S) | : Jae Eun Lee et al. | |

It is certified that error appears in the above-identified patent and that said Letters Patent is hereby corrected as shown below:

On the Title Page

Column 1, Item (54), Line 3, after "ACID" insert -- COPOLYMER --

Column 2, Abstract, Line 1, After "according" insert -- to --

In the Specification

Column 1, Title, Line 3, after "ACID" insert -- COPOLYMER --

Signed and Sealed this
First Day of July, 2025

Coke Morgan Stewart
*Acting Director of the United States Patent and Trademark Office*